United States Patent

[11] 3,543,662

[72] Inventor Irving Erlichman
    Wayland, Massachusetts
[21] Appl. No. 766,548
[22] Filed Oct. 10, 1968
[45] Patented Dec. 1, 1970
[73] Assignee Polaroid Corporation
    Cambridge, Massachusetts
    a corporation of Delaware

[54] FILM CASSETTE INCLUDING BATTERY POWER SUPPLY
    16 Claims, 4 Drawing Figs.
[52] U.S. Cl........................................... 95/11,
    206/62
[51] Int. Cl....................................... G03b 17/26
[50] Field of Search........................... 95/13, 19,
    31(dec), 66; 96/76; 206/62(Inquired)

[56] References Cited
UNITED STATES PATENTS
2,989,906  7/1961  Rentschler .................. 95/31X
3,447,437  6/1969  Tiffany....................... 95/13

*Primary Examiner*—John M. Horan
*Assistant Examiner*—M. L. Gellner
*Attorneys*—Brown and Mikulka, William D. Roberson and Gerald L. Smith ABSTRACT: A film cassette for photographic cameras configured to retain a number of film units for sequential exposure and a flat battery assembly for powering camera instrumentalities until the film supply is exhausted. The structure includes a spring loaded platform positioned between the battery assembly and film units for compressively retaining the batteries and supporting the film units.

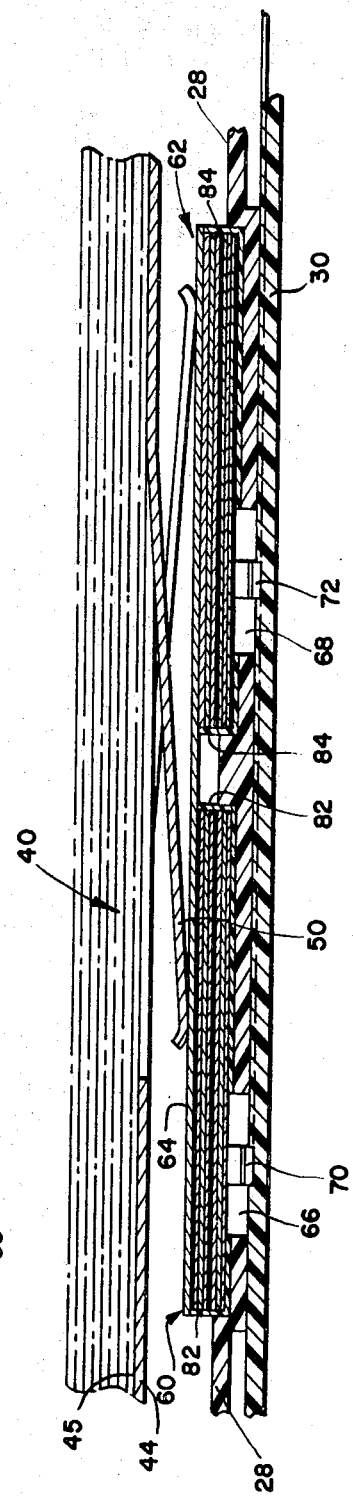
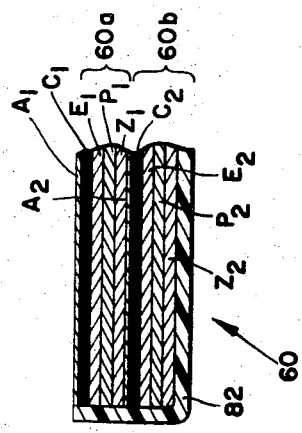

FILM CASSETTE INCLUDING BATTERY POWER SUPPLY

The present invention relates to electrical power supply systems for photographic cameras, and more specifically, to a configuration for a discardable film retaining cassette which intimately incorporates a battery power source.

BACKGROUND OF THE INVENTION

In the course of improving the design of photographic systems, advantage has been recognized in providing for the replenishment of a camera power supply concurrently with the renewal of its film supply. By structurally uniting a battery power supply with film unit containers or cassettes, this replenishment is assured and the resultant union of components has been found to derive several interrelated functional improvements. The power source included within the film units is used only during the relatively limited operational interval determined by the number of exposures in a film cassette. As a consequence, the battery formed in conjunction with each film cassette may be of the primary variety. For the limited utilization occasioned by this arrangement, such batteries will retain their most efficient charge characteristics and advantage may be taken of the available low cost of primary battery structures to the extent that they may be incorporated with disposable cassettes or film containers. Under current battery design capabilities, this discardable feature is available at costs comparable with conventional photographic battery power sources.

When the battery is mounted within a disposable film cassette, it shares the environmental protection normally afforded packaged film. Consequently, until it is utilized within a camera as a power source, the battery will be stored under optimum energy conserving conditions. For instance, cassettes containing unexposed film are generally warehoused at controlled lower temperatures and within sealed containers. Additionally, unexposed film storage procedures include more or less rigidly administered dating techniques established in correspondence with the relatively short shelf lives of the product. The storage requisites for primary batteries ideally correspond with these conditions. Charge retention is maximized at lower storage temperatures. Chemical decomposition is minimized within a low temperature protective environment. Of particular advantage, the restricted storage periods for film fall in correspondence with the limited shelf life of the primary cells. As a consequence, the primary cells are made available for use while uniformly retaining a substantial portion of their original energy content.

Cassette structures within which batteries are incorporated necessarily must be the subject of careful design attention. The materials from which cassettes are fabricated and their configurations should be selected not only in correspondence with the economic considerations of disposable systems but also in keeping with functional requirements for strength, lighttight integrity and size. A practical union of the functions of battery mounting and photosensitive film retention suggests that the battery arrangement ideally should complement the film positioning apparatus of a cassette structure. However, the union may result in an overly involved structure where the cassettes are configured for use in cameras of the internally processing or self-developing variety. Film containers for these cameras function to retain a plurality of photosensitive film units which are internally manipulated so as to be sequentially positioned at an exposure frame or aperture disposed within one surface of a cassette. Such film units generally incorporate rupturable pods containing developing materials used by processing mechanisms positioned within a camera housing. The sequential manipulation of each film unit through the cassette structure to a position for exposure, then out of the cassette and into the processing mechanism must be performed with considerable accuracy and reliability.

When battery power systems are introduced into these cassette assemblies for self-processing cameras, design modifications to their shape and internal configuration must be minimized. Additionally, in order to maintain acceptably low production costs, the modified cassette structures should be fabricable with efficient high volume production techniques.

SUMMARY OF THE INVENTION

The present invention provides photographic apparatus including a film cassette assembly uniquely adapted to retain a select number of photosensitive film units in position for their sequential exposure and also to efficiently carry a battery arrangement for powering the instrumentation of a camera within which the cassette is insertable. using batteries of flat configuration, the cassette structure incorporates an internal mounting arrangement for flat batteries while requiring no significant increase in size or alternation of a shape otherwise required for retaining the film units alone. As a consequence, the cassette structure is available for use with modern compact camera structures.

The inventive cassette is configured from a significantly small number of structural components which are typified in having noncomplex and, therefore, economically fabricated shapes. As a distinguishing feature, these parts are designed to mutually cooperate in providing the dual film unit and battery retaining functions of the device.

The simplicity realized from imparting a dual function to components of the cassette permits its assembly with low cost, high volume procedures. By selecting the output ratings of the batteries mounted with the cassette structure in correspondence with the camera instrumentation power demands required for exposing and/or processing only the film units contained within each assembly, the low cost cassettes are discardable following the exhaustion of their film supplies.

The cassette assembly of the invention is particularly characterized in the use internally of a film supporting platform member having outwardly biased spring means. Oriented between a stacked array of film units and a flat battery assembly, the platform serves the dual function of supporting and sequentially elevating stacked planar film surfaces to positions for exposure at one face of a cassette while providing a compressive force against a cassette wall which is utilized by the battery assembly. The compressive force or bias derived from the spring loaded platform may be used to improve and simplify the terminal interconnections of flat batteries positioned within the cassette parallel with and opposite from the film units. Where flat primary batteries are employed within the cassette structure, additional advantage is realized in that their constituent primary cells may perform more reliably when maintained under slight compressive loads.

An additional feature and object of the invention is to provide a cassette structure for use with cameras of the self-developing variety which is configured to include a housing having a frontal surface defining an exposure frame opening behind which photosensitive film units are exposable in sequence. The film units are supported against the front surface frame by a resilient spring loaded platform which also functions to compress a flat planar primary battery assembly which is internally nested against a cassette back wall disposed oppositely from its frontal surface. The platform is also used to retain a cross-connecting terminal strap or bus against selected inwardly exposed electrode surfaces of the batteries. Terminal access means are associated with the back wall of the cassette for purposes of interconnecting the power supply with power consuming instrumentation of a photographic camera.

Other objects of the invention will in part be obvious and will in part appear hereinafter.

The invention accordingly comprises the apparatus possessing the construction combination of elements and arrangement of parts which are exemplified in the following detailed disclosure.

For a fuller understanding of the nature and objects of the invention, reference should be had to the following detailed

BRIEF DESCRIPTION OF THE DRAWINGS

FIG. 3 is a sectional and fragmentary view of a cassette structure according to the invention portraying the interrelationship of a stacked film array, a supporting platform and flat battery power source; and FIG. 4 is an enlarged sectional and fragmentary view of a primary battery unit.

DETAILED DESCRIPTION OF THE DRAWINGS

The cassette arrangement of the invention is capable of incorporation within a wide variety of photographic camera structures. For purposes of illustration, it is described in connection with a camera configuration which incorporates an electrically powered internal film processing function. This self-processing function along with those providing exposure control and artificial subject illumination derive their supply of power solely from the batteries furnished with a disposable cassette.

Figure 1:
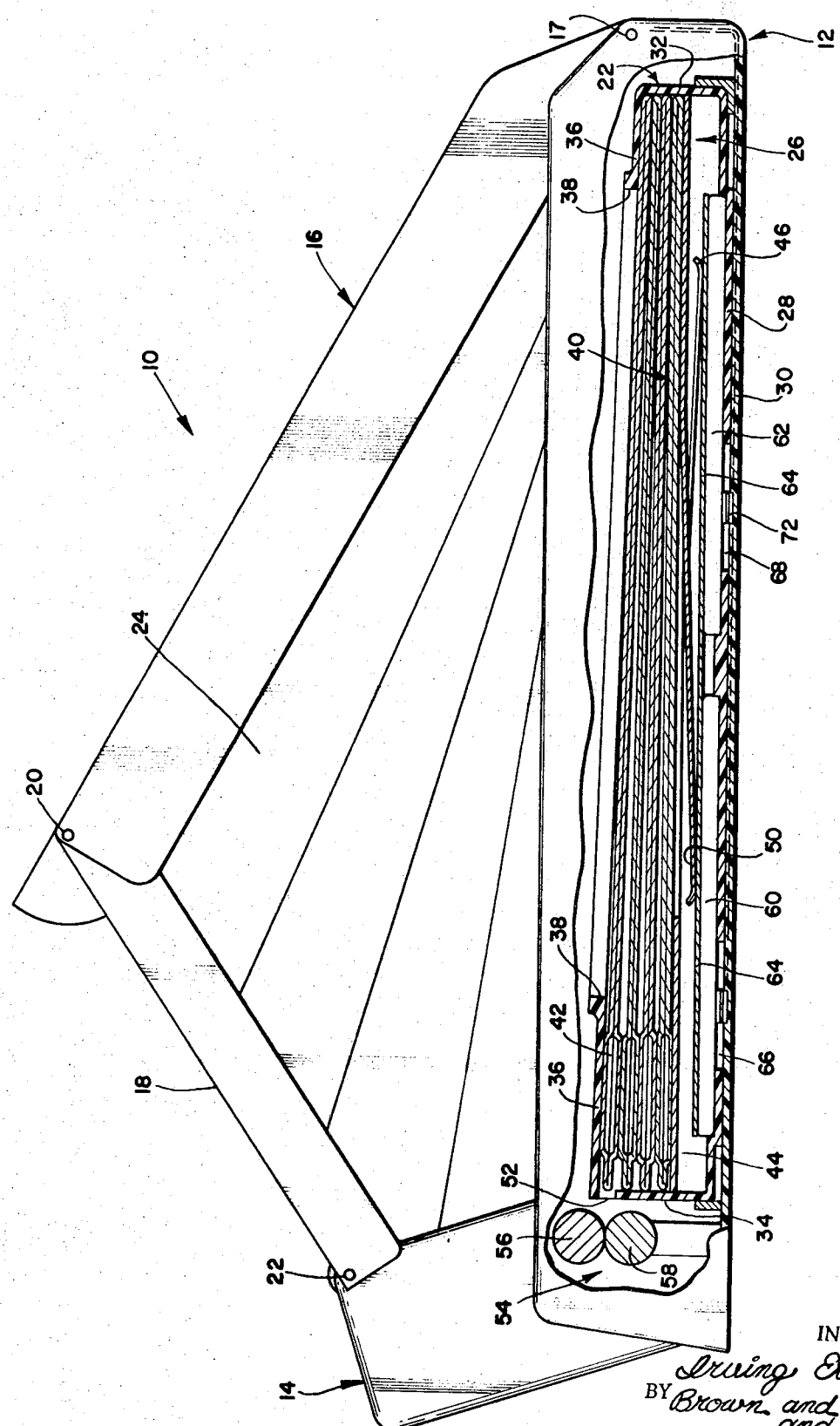
FIG. 1 is a side elevational view of a cassette assembly embodying invention shown within a camera and with portions broken away to reveal internal structure.

Referring to FIG. 1, the camera structure shown generally at 10 is illustrated having a hexahedron configuration formed from four articulative housing portions or sections. These sections include a base or principle body housing 12 to which is pivotally attached a forward lens and mounting unit 14 and a top section 16. A hinge arrangement for the latter pivotal connection is indicated at 17. Top section 16 and forward unit 14 are each hinged to the edges of a frontal section 18, thereby completing the peripheral structuring of the assembly. The pivotal interconnection of frontal section 18 with its contiguous components is provided by hinge assemblies, the center pins of which are shown at 20 and 22. Camera assembly 10 is of a folding variety, accordingly, the side panels of the camera body are formed of fan-like bellows members one of which is shown at 24. The bellows members and peripheral components cooperate to provide a lighttight internal chamber within which photosensitive film materials are exposed. To retain these photosensitive sheets in position for appropriate exposure, main body housing 12 is configured having a receiving chamber for removably retaining a film cassette 26.

During a film exposing sequence, an exposure system including a lens, aperture and shutter arrangement mounted in forward unit 14 functions in the usual manner to image a scene being photographed upon a photosensitive film sheet positioned at the upper surface of cassette 26. The optical path through which this is accomplished includes reflection from the inner, slanted surface of top section 16. This folded optic arrangement permits a smaller, more compact and convenient camera housing design. A more detailed description of such compact camera structures is provided in a copending U.S. Pat. application of Land et al. Ser. No. 655,850 filed July 25, 1967 and assigned to the assignee of the instant application.

Looking to the general configuration of the cassette 26, it is seen to be formed having a rear wall 28 the exterior surface of which nests against the bottom panel 30 of main body housing 12. Depending from rear wall 28 are sidewalls as at 32 and 34. Spaced oppositely from rear wall 28 is a forward wall 36 within which is formed an exposure frame opening 38. Positioned beneath the forward wall 36 and its frame 38 is an assemblage of stacked film units depicted generally at 40. The term "film unit" is used herein to refer to any of the broad variety of film and/or sheet processing structures incorporated within a cassette. The film unit depicted in the drawing are of the type shown and described in U.S. Pat. applications of Edwin H. Land, Ser. No. 622,287 and Edwin H. Land et al. Ser. No. 622,286 both filed Mar. 10, 1967. Each of the units incorporates all of the material necessary to produce a positive photographic image. The general structure of each includes a photosensitive material which is cooperatively combined with a transparent image receiving sheet. Each film unit also includes a rupturable pod or container for holding a developing agent, a series of which are illustrated in stacked relationship at 42. Beneath the film supply 40 there is positioned spring loaded platform 44 having a film supporting surface 45. The platform is formed of a resilient material and incorporates a compressive spring support arrangement formed integrally from depending tab members 46, 48 and 50. The resilient platform functions to urge the forwardmost film unit into position against frame 38 at the imaging plane for appropriate exposure within the internal chamber of the camera.

Following the exposure of a film unit at the image plane, means are provided within the camera for engaging this forwardmost film unit and drawing it from the cassette 26 through an exit slot 52 for introduction to a pressure applying roller assembly as shown at 54. Assembly 54 is portrayed as a pair of cooperatively rotating motor driven rolls 56 and 58. As a film unit is advanced through the pressure applying assembly 54 its attached pod is ruptured, processing liquid within the pod is spread between its respective film components and an image developing function commences.

To supply electrical power for the pressure applying assembly as at 54, as well as to power the exposure instrumentation of the camera, a flat battery assembly is included within the cassette structure 26. This battery assembly is shown to include two flat units 60 and 62 which nest in indentations formed within cassette rear wall 28. Over the batteries is positioned a metallic plate or strap 64. Plate 64 is urged against the batteries 60 and 62 by virtue of the pressure imposed by resilient platform tabs 46, 48 and 50. The plate, while functioning to compressively retain the battery structure in appropriate nested position, also may serve as an interior terminal connecter for the battery assembly.

The electrical power supply provided by flat battery units 60 and 62 is distributed into the power consuming instrumentation of the camera by terminal interconnections made through openings as at 66 and 68 which are positioned in the rear wall 28 of the cassette. Connection between the circuitry of the camera and the battery electrodes is effected by spring loaded terminals as at 70 and 72 which are permanently mounted upon bottom panel 30 of main body housing 12. Terminals 70 and 72 are connected respectively with conductive straps 74 and 76 which are mounted in insulated fashion within the bottom panel 30 and are electrically tied in with the instrumentation of the camera through additional connection not shown.

In the assembly thus far described, the film supporting platform arrangement 44 may be seen to provide a dual operational function. FOr instance, the platform continually positions the foremost film unit before the exposure aperture 38, i.e., at the image plane of the camera. Additionally, the platform, through its resilient depending tabs 46, 48 and 50 compressively acts against the assembly of flat batteries 60 and 62. The conductive plate 64, which may be interposed between the resilient platform and the battery assembly, uniformly distributes the compressive force of the spring loaded platform while providing for battery electrode interconnection.

Figure 2:
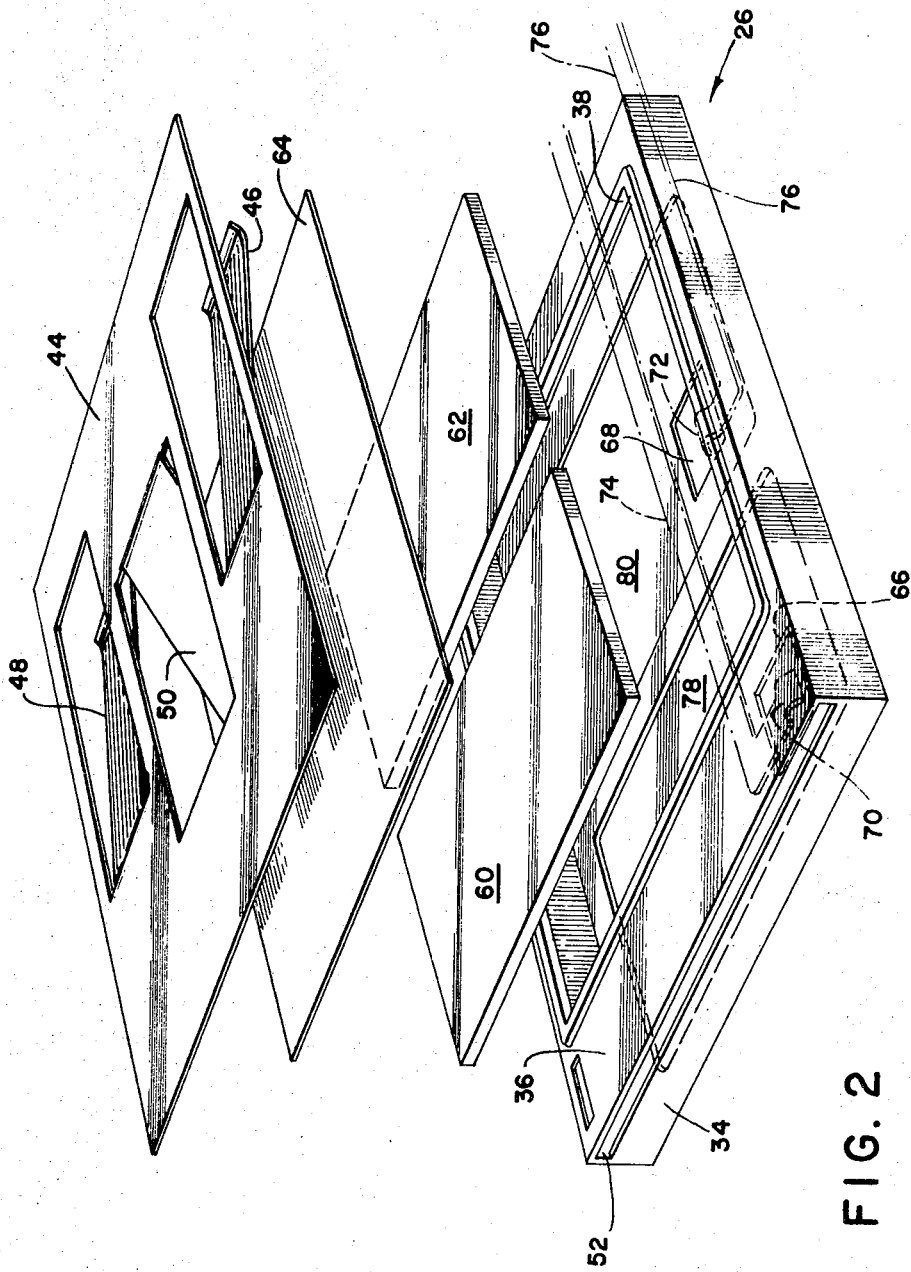
FIG. 2 is a perspective view of a cassette assembly according to the invention showing its major structural components in exploded fashion.

The cassette arrangement of the invention is configured so as to be discardable upon exhaustion of its film supply. In keeping with this discardable feature, the battery power unit incorporated with the cassette is selected having a power capacity sufficient to operate camera exposure and processing instrumentation for a select number of film exposures. To maintain necessary low production costs, however, the battery units must be mountable within the cassette structure using only a minimum number of parts and with simplified and practical production techniques. This necessary simplicity and practicality is provided with the present cassette structure as portrayed in the exploded representation of the power unit portion of the cassette at FIG. 2. Looking to the FIG., it may be seen that the flat battery panels 60 and 62 are dimensioned so as to be readily insertable within indentations in the rear wall of the cassette shown respectively at 78 and 80. To facilitate their mounting, a small amount of glue may be used to hold them in position. Terminal connection between battery panels 60 and 62 is provided by the simple expedient of positioning plate 64 over their outwardly exposed surfaces. To assure proper contact of plate 64 upon the electrode surfaces of the battery panels the spring loaded feature of platform 44 is used. To provide external access to the terminals of the battery structure, holes as at 66 and 68 are formed within the rear wall of the cassette. By simply placing a cassette within the camera, terminal interconnection between the battery units and camera instrumentation is assured. Since the holes 68 and 70 are entirely covered by one surface of the battery units 60 and 62, the lighttight integrity of the rear wall of the cassette is maintained. As may be evidenced from the foregoing, the assembly procedure for placing the power unit within the cassette involves highly practical sequential assembly techniques. The components forming the power unit assembly are few in number and of a modular nature. Consequently, they are available at costs sympathetic with the discardable feature desired in the cassette arrangement.

Primary batteries, generally considered those which cannot be recharged, have the power capacities and low unit costs needed for incorporation within the cassette. Referring to FIG. 3, a flat primary battery assembly is shown mounted upon the rear wall of a cassette structure. Two battery units 60 and 62 are used within the power arrangement and each of the units is formed of two discrete primary cells which are superimposed for series connection within a cassette. Battery units 60 and 62 are mounted upon wall 28 in reversed orientation and are electrically united in series by pressure plate 64. This arrangement provides a series connected output at the terminal openings 66 and 68. In addition to providing a series interconnection of the battery units 60 and 62, plate 64 maintains the cell structures of the units under a minor compressive load. It has been empirically determined that such compressive loading aids in minimizing corrosive breakdown of the cells by enhancing the integrity of the laminar structure from which they are formed. The battery units are pictured in exaggerated scale to reveal this laminar structure. To prevent leakage, portions of their external surfaces are coated with a plastic or the like as depicted at 82 and 84.

The structure of one of the battery units as at 60 is more clearly revealed in an enlarged scale fragmentary view at FIG. 4. Referring to that FIG., the dual cell structure 60 is revealed as a multilayered arrangement of cells configured in series fashion. The materials from which each of the cells is produced may vary to meet specific design needs, however, conventional low cost carbon-zinc primary battery components will be found suitable for most applications. Two superposed cells $60_a$ and $60_b$ are shown in the FIG. The upper cell 60a is fashioned having a cathode electrode formed of a thin layer of carbon $C_1$ over which has been deposited a thin aluminum film $A_1$. Aluminum film $A_1$ functions to provide a conductive path and terminal from which the electrode may be tapped. An anode electrode $Z_1$ for the first cell is depicted as a thin sheet of zinc. Between this anode $Z_1$ and cathode $C_1$ is an electrolytic paste $E_1$ and paper separator $P_1$.

A second and identically structured cell $60_b$ is shown laminated with cell 60a Fabricated in fashion similar to cell $60_a$, cell $60_b$ is shown having a cathode layer $C_2$ of carbon over which is deposited an aluminum film $A_2$. A layer of electrolytic paste $E_2$ and paper separator $P_2$ separate the cathode layer $C_2$ from an anode $Z_2$ fashioned of zinc.

The capacity of each of the primary battery cells as described will vary substantially in proportion to the areas of their flat or active surfaces. Typically, one such cell will produce about 0.10 to 0.15 amperes per square inch of surface area while yielding about 1.5 volts. For popular photographic camera sizes, an area within each film cassette available for retaining the batteries will provide about 10 to 12 square inches of practical surface. It follows, therefore, that the battery capacity desired for a film supply-power source combination readily may be varied through the simple expedient of combining a select number of discrete cells of predetermined dimension.

The intimate association of a flat multicell primary battery with a film retaining cassette holds particular advantage as a result of the film packaging techniques common in the industry. Each loaded film cassette is hermetically sealed within lighttight moistureproof containers. Further, the film is conventionally stored at controlled lower temperatures for limited periods of time until released for purchase by the consuming public. The combination of protection from an external influence by packaging along with storage for limited periods under ideal temperature conditions greatly enhances the reliability of the power source provided by the batteries. In the same light, the primary batteries will be utilized within the relatively short period of time required to exhaust the nominal number of exposures available from the film supply of the cassette structure. The reliability of the cells is additionally enhanced by the film supporting and battery compressing function of the internal structure of the cassette. All of the above factors combine to permit the use of the inexpensive flat cell configuration of a primary battery.

Since certain changes may be made in the above system and apparatus without departing from the scope of the invention herein involved, it is intended that all matter contained in the above description or shown in the accompanying drawings shall be interpreted as illustrative and not in a limiting sense.

I claim:

1. A film cassette for photographic apparatus comprising in combination:
    a plurality of photographic film units, each including at least one photosensitive layer, stacked in parallel relationship;
    a cassette body having mutually spaced rear and forward walls, said forward wall including a frame opening through which said film units can be sequentially exposed;
    at least one planar electrochemical battery positioned over an inward surface of said rear wall;
    spring loaded platform means disposed within said cassette body intermediate said film units and said battery for supportively urging said film units into position for exposure at said frame opening and simultaneously compressively biasing said battery against said rear wall; and
    means exposing terminals of said battery for power supply interconnection with photographic apparatus within which said cassette is insertable.

2. The film cassette of claim 1 wherein:
    at least two said planar electrochemical batteries are positioned over an inward surface of said rear wall; and
    including an electrically conductive planar support member interposed between said flat platform means and said batteries and forming a terminal interconnection between said batteries.

3. The film cassette of claim 1 in which:
    said planar battery is configured having a plurality of discrete series connected electrochemical primary cells formed with paired planar electrodes; and
    said terminal exposing means includes at least one opening formed within said cassette body rear wall in a position selected for exposing at least a portion of one said electrode.

4. The film cassette of claim 1 wherein:
    at least two said planar batteries are positioned over an inward surface of said rear wall in a manner providing a mutually reversed orientation of their polarities; and
    including an electrically conductive planar support member interposed between said platform means and said batteries and forming a terminal coupling between said batteries.

5. The film cassette of claim 4 in which:
each said planar battery is formed of at least one electrochemical primary cell having paired planar electrodes; and
said terminal exposing means includes at least two openings formed within said cassette body rear wall and selectively spaced to expose at least a portion of outwardly facing cell electrodes of opposite polarities.

6. The film cassette of claim 1 in which said planar battery is a primary battery.

7. The film cassette of claim 6 including a planar support member interposed between said platform means and said battery.

8. The film cassette of claim 7 in which said spring loaded platform means is configured as a sheet of resilient material having integrally depending tab means extending therefrom for resiliently supporting said platform against said planar support member.

9. The film cassette of claim 8 wherein said tab means comprise protuberances integrally connected with and formed from said platform material and biased outwardly therefrom to provide a predetermined outwardly biased spring force.

10. Apparatus for exposing photographic film units each including at least one photosensitive layer comprising:
a photographic camera including:
electrically powered means within said camera for performing at least one operation in connection with the exposure of said photosensitive film units;
a housing having a receiving chamber for retaining a quantity of said film in position for the said exposure;
electrical contact means disposed within said chamber for releasably connecting said electrically powered means with a battery power supply;
a disposable cassette including:
a plurality of said film units stacked in parallel relationship;
a cassette body configured for removable insertion within said receiving chamber and having mutually spaced rear and forward walls, said forward wall including a frame opening through which said film units can be sequentially exposed;
at least one planar electrochemical battery positioned over an inward surface of said rear wall and having an energy capacity sufficient to operate said electrically powered means throughout the exposure of said select number of film units;
spring loaded platform means disposed within said cassette body intermediate said film units and said battery for supportively urging said film units into position at said frame opening and simultaneously compressively biasing said battery against said rear wall; and
means exposing terminals of said battery for power supply interconnection with said electrical contact means.

11. The apparatus of claim 10 in which:
said planar battery is a primary battery; and
said cassette includes a support member interposed between said platform means and said battery.

12. The apparatus of claim 11 in which:
said spring loaded platform means is configured as a sheet of resilient material having integrally depending tab means extending therefrom for resiliently supporting said platform against said planar support member.

13. The apparatus of claim 10 wherein:
at least two said planar electrochemical batteries are positioned over an inward surface of said cassette rear wall; and
including an electrically conductive planar support member interposed between said platform means and said batteries and forming a terminal interconnection between said batteries.

14. The apparatus of claim 10 wherein:
said planar battery is configured having a plurality of discrete series connected electrochemical primary cells formed with paired planar electrodes; and
said terminal exposing means includes at least one opening formed within said cassette body rear wall in a position selected for exposing at least a portion of one said electrode.

15. The apparatus of claim 10 wherein:
at least two said planar batteries are positioned over an inward surface of said rear wall in a manner providing a mutually reversed orientation of their polarities; and
including an electrically conductive planar support member interposed between said platform means and said batteries and forming a terminal coupling between said batteries.

16. The apparatus of claim 10 wherein:
each said planar battery is formed of at least one electrochemical primary cell having paired planar electrodes; and
said terminal exposing means includes at least two openings formed within said cassette body rear wall and selectively spaced to expose at least a portion of outwardly facing cell electrodes of opposite polarities.